US007782309B2

(12) United States Patent
Janik

(10) Patent No.: US 7,782,309 B2
(45) Date of Patent: *Aug. 24, 2010

(54) CONTROLLING DEVICE WITH DUAL-MODE, TOUCH-SENSITIVE DISPLAY

(75) Inventor: Craig M. Janik, Los Altos Hills, CA (US)

(73) Assignee: Universal Electronics Inc., Cypress, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 12/103,895

(22) Filed: Apr. 16, 2008

(65) Prior Publication Data

US 2008/0191898 A1 Aug. 14, 2008

Related U.S. Application Data

(63) Continuation of application No. 11/290,358, filed on Nov. 30, 2005, now Pat. No. 7,432,916.

(60) Provisional application No. 60/634,680, filed on Dec. 9, 2004.

(51) Int. Cl.
*G09G 5/00* (2006.01)

(52) U.S. Cl. ........................................ 345/173; 348/734

(58) Field of Classification Search ................. 345/173, 345/156, 169; 348/14.02, 14.03, 14.05, 734; 340/5.61, 825.22; 715/700, 717; 178/18.01; 341/176; 386/83
See application file for complete search history.

(56) References Cited

U.S. PATENT DOCUMENTS

| 4,623,887 A | 11/1986 | Welles, II |
| 4,959,810 A | 9/1990 | Darbee et al. |
| 5,255,313 A | 10/1993 | Darbee |
| 5,481,256 A | 1/1996 | Darbee et al. |
| 5,552,917 A | 9/1996 | Darbee et al. |
| 5,614,906 A | 3/1997 | Hayes et al. |
| 5,724,567 A | 3/1998 | Rose et al. |
| 5,758,257 A | 5/1998 | Herz et al. |
| 5,884,028 A | 3/1999 | Kindell et al. |
| 5,926,624 A | 7/1999 | Katz et al. |
| 5,959,751 A | 9/1999 | Darbee et al. |
| 6,014,092 A | 1/2000 | Darbee et al. |
| 6,137,479 A | 10/2000 | Olsen et al. |
| 6,225,938 B1 | 5/2001 | Hayes et al. |
| 6,700,893 B1 | 3/2004 | Radha et al. |
| 6,708,213 B1 | 3/2004 | Bommaiah et al. |
| 6,794,992 B1 | 9/2004 | Rogers |
| 6,914,551 B2 * | 7/2005 | Vidal .......................... 341/176 |
| 7,117,516 B2 | 10/2006 | Khoo et al. |
| 7,283,084 B2 * | 10/2007 | Di Peppe ..................... 341/176 |
| 7,432,916 B2 * | 10/2008 | Janik .......................... 345/173 |
| 2003/0025840 A1 | 2/2003 | Arling |
| 2003/0103088 A1 | 6/2003 | Dresti et al. |

* cited by examiner

*Primary Examiner*—Abbas I Abdulselam
(74) *Attorney, Agent, or Firm*—Greenberg Traurig, LLP

(57) ABSTRACT

A universal controlling device having a touch-sensitive display. The display provides one or more graphical user interfaces comprised of graphical user interface icons that are selectable via the touch-sensitive display and the display accepts motions made by a stylus or finger in contact with the touch-sensitive display. The different interactions with the touch-sensitive display are used to cause the transmission of respective data to one or more appliances.

8 Claims, 4 Drawing Sheets

CONTROLLING DEVICE WITH DUAL-MODE, TOUCH-SENSITIVE DISPLAY

RELATED APPLICATION DATA

This application claims the benefit of and is a continuation of U.S. application Ser. No. 11/290,358, filed on Nov. 30, 2005, which, in turn, claims the benefit of U.S. Application No. 60/634,680, filed on Dec. 9, 2004.

BACKGROUND

The following relates generally to controlling devices and, more particularly, to a controlling device having a dual-mode, touch-sensitive display.

Manufacturers typically provide a controlling device with an appliance and, as such, different appliance types of different manufacturers are often commanded with different controlling devices, also referred to as "remote controls." To minimize the number of individual controlling devices a user requires, universal controlling devices have been developed. Accordingly, universal controlling devices for commanding various operational functions of various types of appliances of various manufacturers have become quite widespread. By way of example, universal controlling devices are described in commonly assigned U.S. Pat. Nos. 4,959,810, 5,255,313 and 5,552,917.

For selecting which of multiple appliances a universal controlling device is to command, a universal controlling device may allow a user to place, i.e., configure, the universal controlling device into an operational mode whereby the function keys will be used to transmit commands to a "primary" target appliance that has been associated with that operational mode. For example, a "TV" operational mode may be selected to place the universal controlling device into an operational mode whereby function keys are used to transmit commands primarily to a designated television, a "VCR" mode may be selected to place the universal controlling device into an operational mode whereby function keys are used to transmit commands primarily to a designated VCR, etc. A universal controlling device may also be provided with an ability to be configured in a "home theater" operational mode (i.e., one established to facilitate a particular activity), a "user" operational mode (i.e., one established for a particular user), a "room" operational mode (i.e., one established for a particular room), or the like (collectively referred to hereinafter as a "home theater" operational mode). In a "home theater" operation mode, the universal controlling device will generally be adapted to command multiple target appliances. For example, a "home theater" mode may be established whereby volume function keys are used to transmit volume control commands to an amplifier, transport function keys are used to transmit transport control commands to a VCR, channel function keys are used to transmit channel control commands to a cable box, picture control function keys are used to transmit picture control commands to a television, etc.

In the case of universal controlling device having a display, various function keys, such as those appropriate for the various operational modes, are typically presented to a user in multiple, different user interfaces each comprising one or more displayed soft keys. For example, commonly assigned U.S. Published Patent Application No. 2003/0103088 (Ser. No. 10/288,727) discloses a universal controlling device application for use in connection with a hand-held device having a display, e.g., a personal digital assistant ("PDA"), wherein the display is utilized to present the multiple, different user interfaces. While the use of a display advantageously allows a universal controlling device to present multiple, different user interfaces to allow for the command of operational functions of one or more appliances, what is needed is a universal controlling device wherein the display is further adapted to provide remote, cursor control functionality.

SUMMARY

In accordance with this and other needs, the following generally discloses a universal controlling device having a dual-mode, touch-sensitive display which is switchable between two operational modes. In one operational mode, the display provides one or more graphical user interfaces comprised of graphical user interface icons that are selectable to command operational functions of one or more appliances. In a second operational mode, the display provides pointer control where motions made by a stylus or finger in contact with the touch-sensitive display result in corresponding motions of a pointer on a display located remotely from the universal controlling device, such as a display connected with a personal computer, a TV, or the like.

A better appreciation of the objects, advantages, features, properties, and relationships of the disclosed controlling devices will be obtained from the following detailed description and accompanying drawings which set forth illustrative embodiments which are indicative of the various ways in which the principles described hereinafter may be employed.

BRIEF DESCRIPTION OF THE DRAWINGS

For use in better understanding the exemplary universal controlling device described hereinafter reference may be had to the following drawings in which.

DETAILED DESCRIPTION

The following discloses a controlling device 100 having a dual-mode, touch-sensitive face panel. In one operational mode of the controlling device 100, the face panel is utilized to accept input to cause a transmission of at least one command to at least one appliance. In a second operational mode of the controlling device 100, the face panel is utilized to accept input for the purpose of controlling a cursor or pointer on a larger, second device, such as a personal computer, television, or the like.

Figure 1:
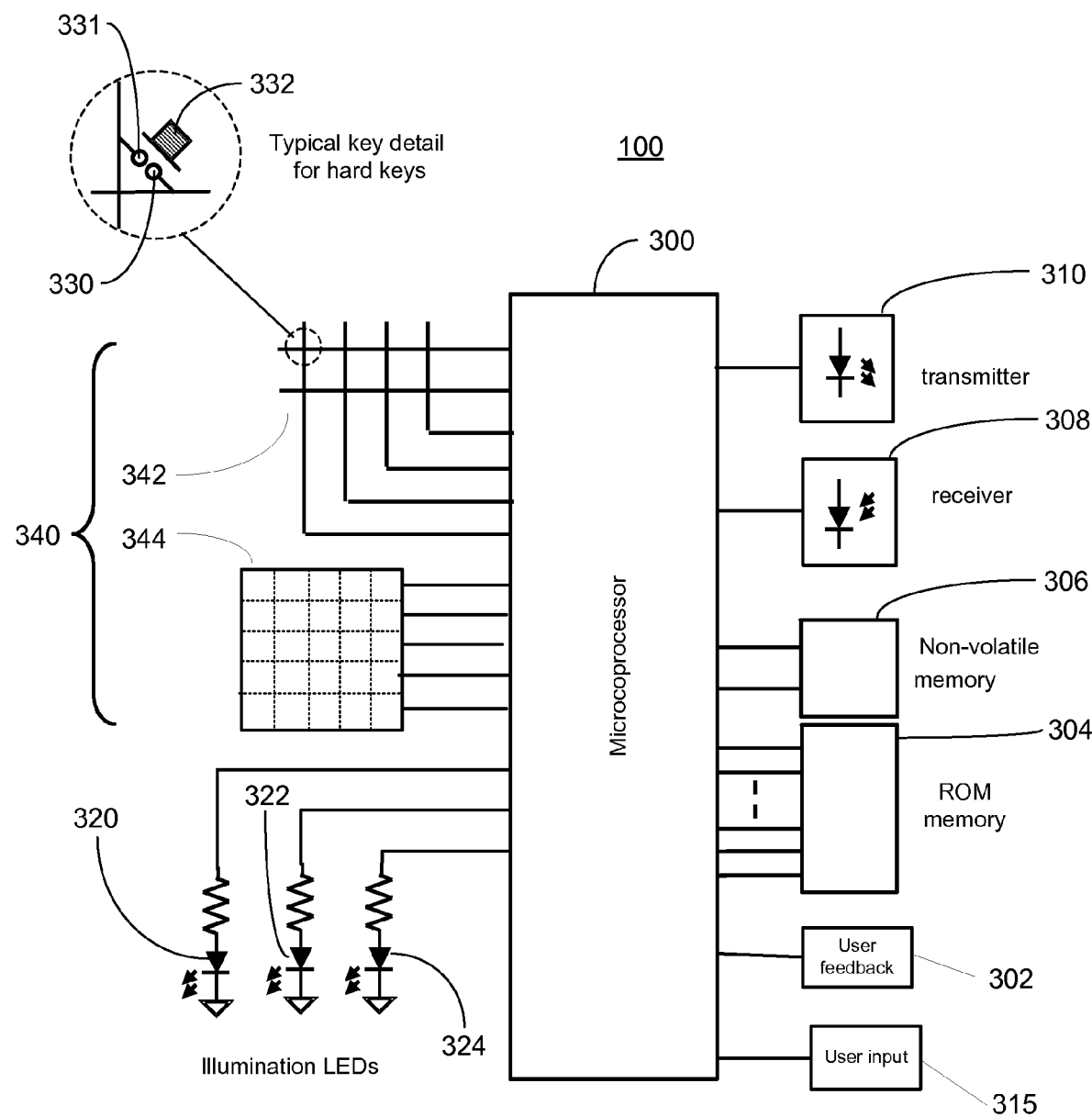
FIG. 1 illustrates a block diagram of exemplary components of an exemplary universal controlling device.

To provide the dual modes of operation, the controlling devices 100 may include, as needed for a particular application, a processor 300 coupled to a ROM memory 304, a key matrix 340 (e.g., a touch-sensitive surface 344 placed over a liquid crystal display (LCD) alone or in combination with hard keys 342 (LCD)), transmission circuit(s) 310, receiver circuit(s) 308 and/or transceiver circuit(s) (e.g., IR and/or RF), a non-volatile read/write memory 306, a means 302 to provide feedback to the user (e.g., LED, display, speaker, and/or the like), a means 315 (such as a microphone, etc.) for receiving additional non-keypress input from the user, and means for providing visual and/or audio cues to the user, as illustrated in FIG. 1. The means for providing visual and/or audio cues to the user, to disseminate information to the user, may be embodied as key illumination means, a sound or voice synthesizer circuit, and/or a digital recording and playback circuit (e.g., to allow a user to playback sound or voice tags input via a microphone or otherwise downloaded into the controlling device). The key illumination means may be in the form of separate elements, such as LEDs 320, 322, and 324, either directly associated with a hard key matrix 342. In the case where the controlling device 100 includes hard keys, an exemplary molded-in key 332 is shown as operative with key matrix circuit 330,331.

To control the operation of the controlling device 100, the ROM memory 304 may include executable instructions that are intended to be executed by the processor 300. In this manner, the processor 300 may be programmed to control the various electronic components within the remote control 100, e.g., to monitor a power supply (not shown), to cause the transmission of signals, control the key illumination means 320, 322, and 324, sound circuits, etc. The non-volatile read/write memory 306, for example an EEPROM, battery-backed up RAM, Smart Card, memory stick, or the like, may be provided to store setup data and parameters as necessary. While the memory 304 is illustrated and described as a ROM memory, memory 304 can also be comprised of any type of readable media, such as ROM, RAM, SRAM, FLASH, EEPROM, or the like. Preferably, the memory 304 is non-volatile or battery-backed such that data is not required to be reloaded after battery changes. In addition, the memories 304 and 306 may take the form of a chip, a hard disk, a magnetic disk, and/or an optical disk.

To cause the controlling device 100 to perform an action, the controlling device 100 is adapted to be responsive to events, such as a sensed user interaction with the touch pad overlaying the key matrix 344, interaction with the hard key matrix 342, receipt of a transmission via receiver 308, etc. In response to an event, appropriate instructions within the memory 304 may be executed. For example, when a function command key is activated on the controlling device 100, the controlling device 100 may retrieve a command code corresponding to the activated function command key from memory 304 and transmit the command code to an intended target appliance in a format recognizable by that appliance.

It will be appreciated that the instructions within the memory 304 can be used not only to cause the transmission of command codes and/or data to the appliances, but also to perform local operations. While not limiting, local operations that may be performed by the controlling device 100 may include displaying information/data, favorite channel setup, macro key setup, function key relocation, user programming of favorite channel selections, etc. A further, local operation is the ability to "lock" function keys across device operational modes as described in previously referenced U.S. Published Patent Application No. 2003/0025840. Examples of still further local operations can be found in U.S. Pat. Nos. 5,481,256, 5,959,751, and 6,014,092.

For creating a correspondence between a command code and a function command key, data may be entered into the controlling device 100 that functions to identify an intended target appliances by its type and make (and sometimes model). Such data allows the controlling device 100 to transmit recognizable command codes in the format appropriate for such identified appliances. Typically, intended target appliances are identified for each operational mode of the controlling device 100. Since methods for setting up a controlling device to command the operation of specific home appliances are well-known, such methods need not be described in greater detail herein. Nevertheless, for additional information pertaining to setup procedures, the reader may turn to U.S. Pat. Nos. 4,959,810, 5,614,906, and 6,225,938. It will also be appreciated that a controlling device 100 may be set up to command an appliance 102 by being taught the command codes needed to command such appliance as described in U.S. Pat. No. 4,623,887. Still further, it will be understood that command codes may be pre-stored in the controlling device 100 or the controlling device 100 may be upgradeable, for example via use of receiver 308.

Figure 3:
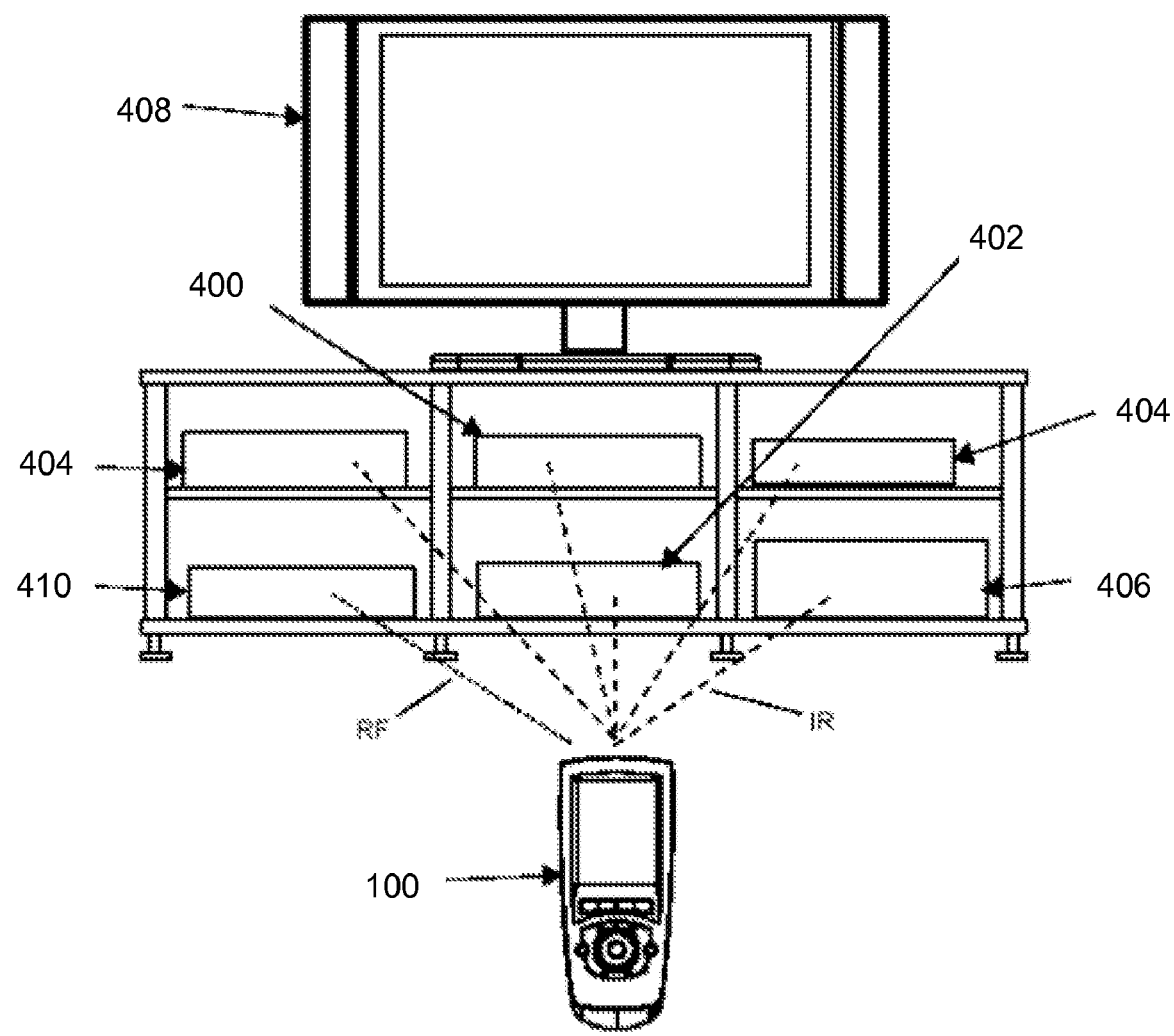
FIG. 3 illustrates an exemplary system environment in which the exemplary universal controlling device of FIG. 2 may be utilized.
Figure 4:
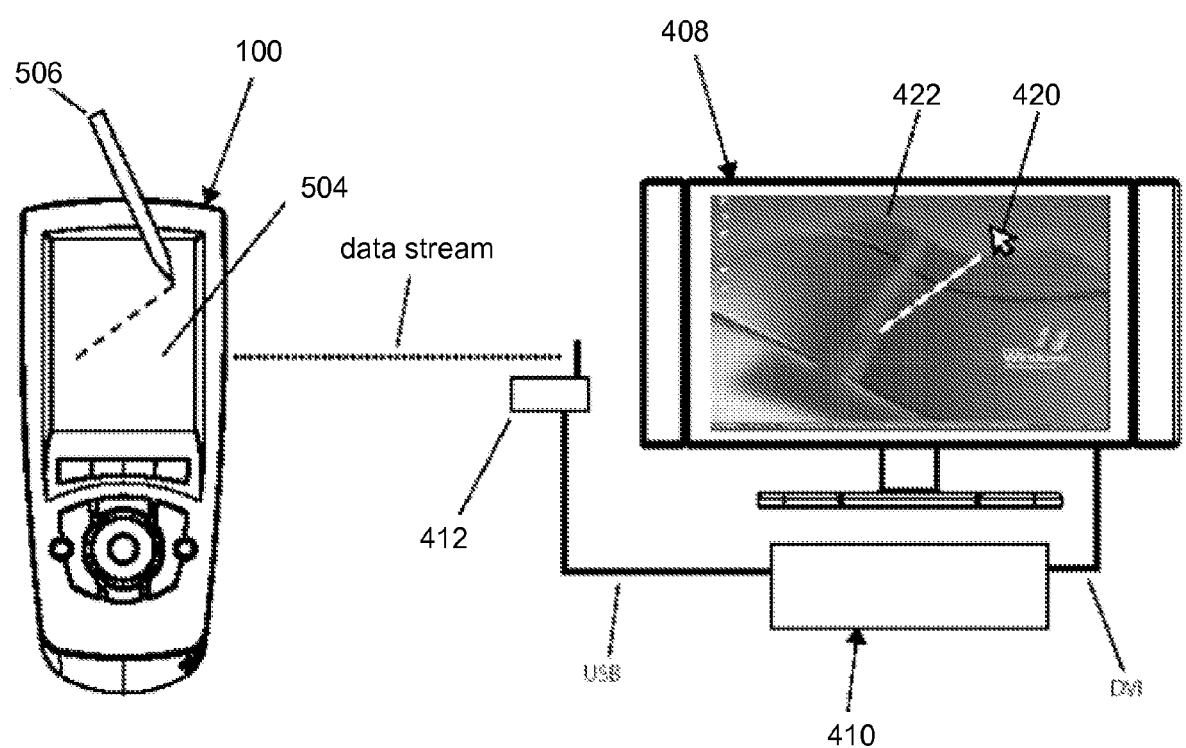
FIG. 4 illustrates an exemplary flow of data within the exemplary system environment of FIG. 3.

As illustrated in FIG. 3, the universal controlling device 100 may be utilized to command functional operations of multiple appliances, such as those typically found in a home entertainment center. Thus, appliances controllable by the universal controlling device 100 may include VCRs 400, DVD and CD players 402, cable set-top boxes and satellite receivers 404, AV receivers 406, televisions 408, as well as lighting, heating, etc. without limitation. Typically, commands are transmitted to such appliances using an IR protocol. The universal controlling device 100 may also be utilized to command functional operations of a home theater personal computer ("HTPC") 410. An HTPC 410 is typically a PC that is set up at the home entertainment center and is used mainly for home entertainment functions such as for playing back music and video files, playing DVDs, and for viewing digital photos. The HTPC 410 may be connected to the Internet and may also be used for viewing Internet browser content, such as news, email, search results, and the like. Preferably, the universal controlling device 100 utilizes an RF protocol when communicating with the HTPC 410 which allows for communications beyond line-of-sight. In this regard, as illustrated in FIG. 4, communications with the HTPC 410 may be made by means of a USB RF transceiver converter 412. The USB converter device 412 includes a converting microcontroller and antenna for receiving and converting a data-stream transmitted in the RF domain by the universal controlling device 100 into USB messages for transmission to the HTPC 410.

Figure 2:
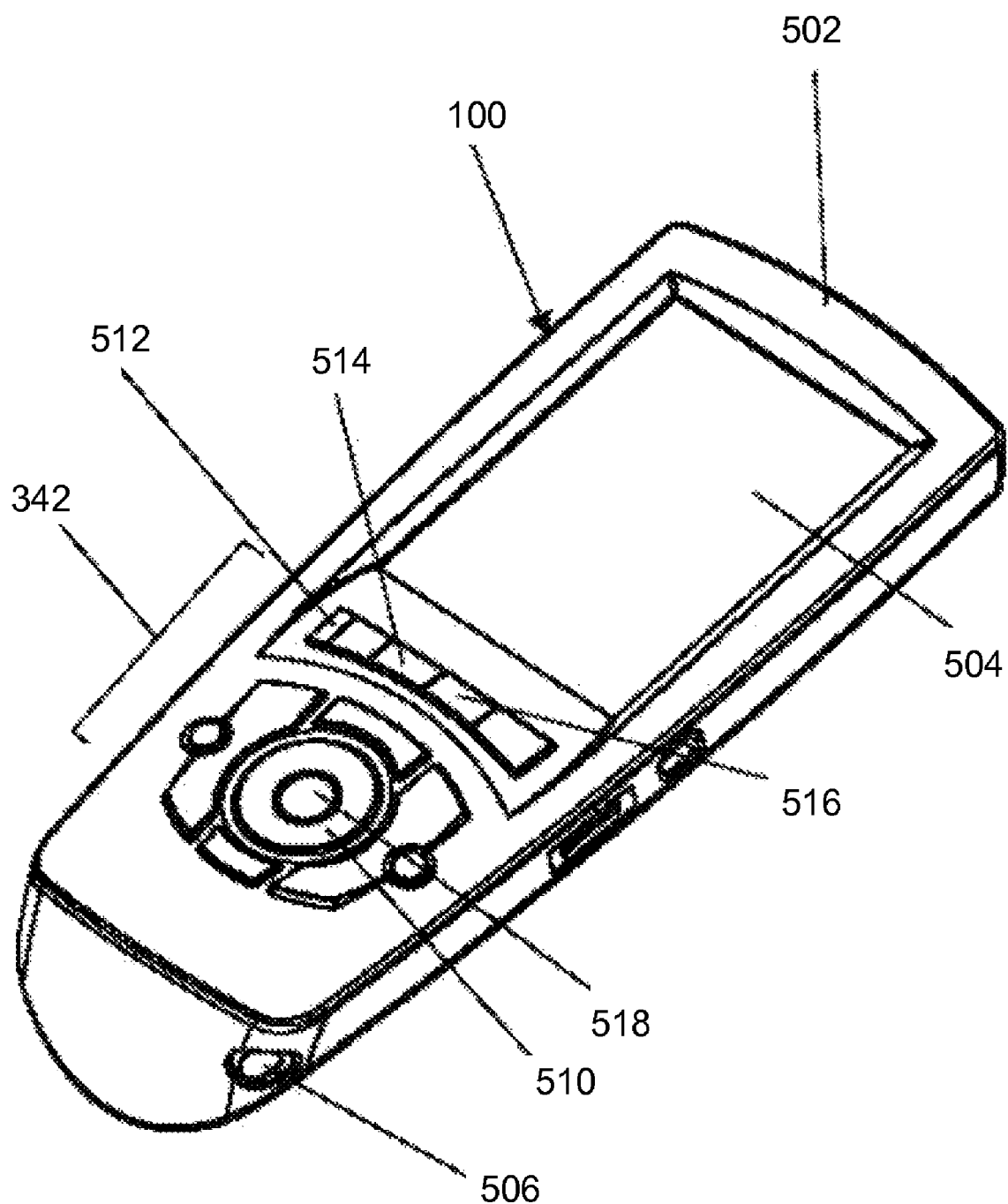
FIG. 2 illustrates an isometric view of an exemplary universal controlling device constructed utilizing the components of FIG. 1.

Turning to FIG. 2, an exemplary embodiment of a universal controlling device 100 is illustrated. In the illustrated embodiment, the various components of FIG. 1 are encased within a housing 502 which also provides access to various of the hard keys 342 and the touch screen display in the form of a dual-mode touch-sensitive display 504. By way of further example, the touch-sensitive display 504 may be 320×240 pixel LCD with a clear touch-sensitive digitizing layer covering the display. As will be well understood, the touch-sensitive display 504 is supported by circuitry which provides the position of a stylus 506 (storable within the housing 502) or finger in contact with touch-sensitive digitizer layer to a microprocessor, i.e., a touch-sensitive digitizing sub-system that provides locations and motions of a stylus or finger in contact with touch-sensitive digitizing layer to the operating system and application software for the purpose of allowing the user to control the software application. As further illustrated in FIG. 2, the universal controlling device 100 may also include a plurality of hard keys or mechanical buttons 342 or controlling various functions on target devices. It is to be understood that the function of the mechanical buttons 342 may change based on the mode of the universal controlling device 100 to thereby allow activations of the mechanical buttons to control various functions on various of the target devices.

For providing dual-mode functionality, the application software of the universal controlling device 100 preferably includes instructions which allow the touch-sensitive digitizer sub-system to switch between control of the local application software on the universal controlling device 100 and control of a computer pointer 420 for the purpose of mousing, i.e., the process of moving a positionable pointer, such as the pointer on a Windows brand PC desktop 422. To this end, the application software may also include a motion scaling function for use in the pointer control mode. Thus, the application software of the universal controlling device 100 will allow the universal controlling device 100 to operate in a first operational mode, in which the display presents a graphical user interface comprised of icons to control one or more of a plurality of audio-visual equipment (target devices), including a TV, VCR, DVD, satellite box, AV receiver and a HTPC, and a second operational mode, in which a pointer is controlled.

In the first operational mode, the universal controlling device 100 may be used to command various conventional operational functions of the home appliances. For example, the universal controlling device 100 may be used to select a specific media playback device, such as a DVD player 402, as the input to the AV receiver 406, resulting in the display of the DVD output on TV 408. In such a process, 4-way navigation mechanical buttons 510 and center select button 518 would typically be used to navigate through selections and menus displayed on the TV 408. Additionally, soft buttons displayed on display 504 as well as mechanical buttons 342 would typically be programmed to control operational functions of the DVD player 402, AV receiver 406, and the TV 408, for example as part of a "home theater" mode. Thus, when operating within the first operational mode, when the user activates a mechanical button or soft button, an command code specific to an operational function on a specific target device is typically sent to target device.

Referring now to FIG. 4, in the second operational mode, i.e., the pointer control mode, touch-sensitive digitizing subsystem on the universal controlling device 100 is used as a mousing (pointer control) input device for the HTPC 410. In one embodiment, a pointer-mode activation button 512, shown in FIG. 2, allows the universal controlling device 100 to be toggled between the first operational mode and the second operational or pointer control mode. As will be appreciated, one or more of the feedback components of the universal controlling device may be utilized to inform the user as to which of the operational modes the universal controlling device 100 have been configured into as a result of actuation of the pointer-mode activation button 512.

When the universal controlling device 100 is placed into the pointer control mode, position information output from touch-sensitive digitizer sub-system is converted into a data-stream and is sent via a (RF or IR) transmitter to the USB (RF or IR) receiver converter 412 that is connected to a USB port on the HTPC 410. USB receiver converter 412 converts the received data-stream into mouse position messages that are sent to the Windows brand operating system of the HTPC 410 via the USB connection. The HTPC 410 may thus use the data provided by the touch-sensitive digitizing sub-system of the universal controlling device 100 identically to data received from a USB mouse, e.g., to control movement of a displayed pointer. This is illustrated in FIG. 4 which demonstrates that, when stylus 506 is moved across the dual-mode display 504, displayed pointer 420 is moved in a corresponding direction on a HTPC desktop 422 displayed on TV 408. Further, a scaling function in the software application may be provided to insure that motions made using a stylus or a finger correspond usably to motions of a PC pointer on the HTPC desktop especially in cases where the LCD on the universal controlling device 100 is in portrait orientation and HTPC GUI desktop 422 is in landscape orientation.

In the preferred embodiment, all of the user interface functions typically associated with mousing are included through use of the pointer control mode of the universal controlling device 100 such as: double-tapping to stick the pointer to a window bar, dragging the window across the desktop, and single tapping to release; double-tapping to open a window or start an application; etc. Additionally, with reference to FIG. 1, when the universal controlling device 100 is in pointer control mode, two of the mechanical buttons 514/516 may be programmed to function as the left and right mouse buttons, as per the functions on such buttons on a mouse or on a laptop PC trackpad.

In a yet further embodiment, the universal controlling device 100 may be switched between the first operational mode and the pointer control mode is switched by actuation of a soft button located on LCD display 504. Still further, the system may be provided with a media management and playback control application running on the HTPC 410 that provides media database browsing and media playback control whereby the advanced remote is used in the first operational mode to conventionally command functional operations of appliances, i.e., a mode wherein graphical user interface elements on the TV display are navigated by using the 4-way switch 510 and center select 518 mechanical buttons, and the second operational mode to command pointer operations. To this end, the system may be adapted wherein the HTPC 410 communicates to the universal controlling device 100 to allow the universal controlling device to toggle between the first operational mode and the pointer control operational mode when the media management and playback control application is entered and exited from the media management and playback control state. For example, when the media management and playback control application is exited, a message may be sent from the application to the universal controlling device 100 via a RF communications link where, upon receipt of this message, the universal controlling device 100 is switched to the pointer control operational mode. It will also be understood that, in cases where the universal controlling device 100 is utilized to command the HTPC 100 to enter and exit the media management and playback control state, the state of the HTPC 100 may be tracked internally within the universal controlling device 100. For example, when a command is issued from the universal controlling device 100 for the purpose of causing the HTPC 100 to exit the media management and playback control application the universal controlling device 100 is also caused to switch to the pointer control operational mode.

While various concepts have been described in detail, it will be appreciated by those skilled in the art that various modifications and alternatives to those concepts could be developed in light of the overall teachings of the disclosure. For example, the universal controlling device 100 may include a WLAN transceiver subsystem for communicating with and controlling devices connected to a WLAN, including the HTPC 410. Additionally, while the embodiments presented above are described in the context of a universal controlling device (i.e. a controlling devices capable of commanding the operation of multiple classes of appliances devices from multiple manufacturers) as being most broadly representative of controlling devices in general, it will be appreciated that the teachings of this disclosure may be equally well applied to other controlling devices of narrower capability without departing from the spirit and scope of the present invention. As such, the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

What is claimed is:

1. A method for using a universal controlling device comprised of a display having a touch-sensitive surface to transmit data to one or more appliances located remotely from the controlling device, comprising:

causing one or more graphical user interfaces comprised of graphical user interface icons to be displayed in the display of the universal controlling device;

accepting via the touch-sensitive surface of the universal controlling device a first input type indicative of a selection of a displayed graphical user interface icon;

causing the universal controlling device to transmit to the one or more appliances first data representative of the displayed graphical user interface icon selected by the first input type;

accepting via the touch-sensitive surface of the universal controlling device a second input type indicative of a motion made across the touch-sensitive surface;

causing the universal controlling device to transmit to the one or more appliances second data representative of the motion made across the touch-sensitive surface provided by the second input type; and causing the universal controlling device to distinguish the first input type received via the touch-sensitive surface from the second input type received via the touch-sensitive surface.

2. The method as recited in claim 1, wherein the universal controlling device supports a first operational mode and a second operational mode and the universal controlling device uses the first operational mode and the second operational mode to distinguish the first input type received via the touch-sensitive surface from the second input type received via the touch-sensitive surface.

3. The method as recited in claim 2, wherein the universal controlling device automatically toggles between the first operational mode and the second operational mode.

4. The method as recited in claim 3, wherein the universal controlling device automatically toggles between the first operational mode and the second operational mode as a function of a state of the one or more appliances.

5. The method as recited in claim 1, wherein the first data comprises command data for commanding one or more operational functions of the one or more appliances.

6. The method as recited in claim 5, wherein the second data comprises data for causing movement of a displayed cursor associated with the one or more appliances.

7. The method as recited in claim 1, wherein at least one of the first data and the second data are transmitted from the universal controlling device utilizing an IR protocol.

8. The method as recited in claim 1, wherein at least one of the first data and the second data are transmitted from the universal controlling utilizing an RF protocol.

* * * * *

(12) INTER PARTES REEXAMINATION CERTIFICATE (977th)
United States Patent
Janik

(10) Number: US 7,782,309 C1
(45) Certificate Issued: *Oct. 24, 2014

(54) CONTROLLING DEVICE WITH DUAL-MODE, TOUCH-SENSITIVE DISPLAY

(76) Inventor: Craig M. Janik, Los Altos Hills, CA (US)

Reexamination Request:
No. 95/001,759, Oct. 5, 2011

Reexamination Certificate for:
Patent No.: 7,782,309
Issued: Aug. 24, 2010
Appl. No.: 12/103,895
Filed: Apr. 16, 2008

(*) Notice: This patent is subject to a terminal disclaimer.

Related U.S. Application Data

(63) Continuation of application No. 11/290,358, filed on Nov. 30, 2005, now Pat. No. 7,432,916.

(60) Provisional application No. 60/634,680, filed on Dec. 9, 2004.

(51) Int. Cl.
*G01N 33/48* (2006.01)
*G01N 27/28* (2006.01)
*G01N 33/487* (2006.01)

(52) U.S. Cl.
USPC .................. 422/68.1; 324/450; 324/403.02

(58) Field of Classification Search
None
See application file for complete search history.

(56) References Cited

To view the complete listing of prior art documents cited during the proceeding for Reexamination Control Number 95/001,759, please refer to the USPTO's public Patent Application Information Retrieval (PAIR) system under the Display References tab.

*Primary Examiner* — Stephen J Ralis

(57) ABSTRACT

A universal controlling device having a touch-sensitive display. The display provides one or more graphical user interfaces comprised of graphical user interface icons that are selectable via the touch-sensitive display and the display accepts motions made by a stylus or finger in contact with the touch-sensitive display. The different interactions with the touch-sensitive display are used to cause the transmission of respective data to one or more appliances.

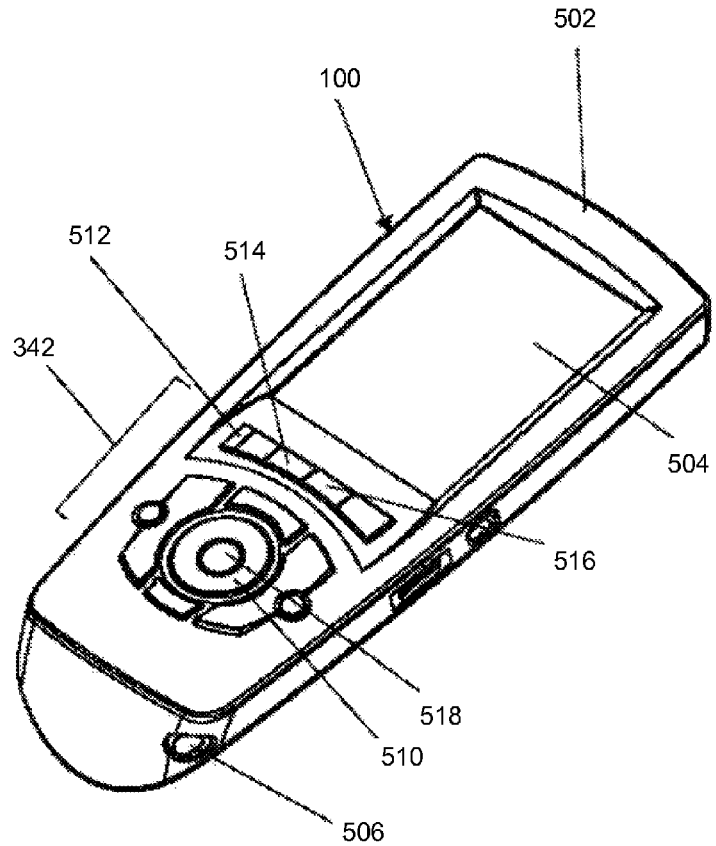

US 7,782,309 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-8 is confirmed.

New claims 9-37 are added and determined to be patentable.

9. *The method as recited in claim 2, comprising causing the universal controlling device to transmit first data representative of a command to control a functional operation of at least one of the one or more appliances in response to activation of at least one hard key of the universal controlling device when the universal controlling device is in the first operational mode and causing the universal controlling device to transmit second data representative of a selection operation in response to activation of the at least one hard key of the universal controlling device when the universal controlling device is in the second operational mode.*

10. *The method as recited in claim 9, wherein the data representative of a selection operation comprises data representative of a mouse button activation.*

11. *The method as recited in claim 3, comprising causing the universal controlling device to automatically toggle between the first operational mode and the second operational mode in response to a communication received from a controllable appliance.*

12. *The method as recited in claim 4, comprising causing the universal controlling device to internally track the state of the one or more appliances.*

13. *The method as recited in claim 1, wherein the display comprises an LCD display with a clear touch-sensitive layer covering the display.*

14. *The method as recited in claim 1, comprising causing information to be displayed in the display in response to a local operation of the universal controlling device being invoked.*

15. *The method as recited in claim 14, wherein the local operation comprises a favorite channel setup operation.*

16. *The method as recited in claim 14, wherein the local operation comprises a macro key setup operation.*

17. *The method as recited in claim 14, wherein the local operation comprises a function key relocation operation.*

18. *The method as recited in claim 1, comprising using a WLAN transceiver of the universal controlling device to transmit at least one of the first data and second data.*

19. *The method as recited in claim 1, wherein a single graphical user interface displayable in the display presents a plurality of graphical user interface icons for use in commanding operational functions of a plurality of different appliances in a home theater mode of the universal controlling device.*

20. *The method as recited in claim 1, comprising causing the universal controlling device to monitor a power supply of the universal controlling device.*

21. *The method as recited in claim 1, comprising causing the universal controlling device to initiate a playing of audio via a speaker of the universal controlling device in response to an input received into the universal controlling device.*

22. *The method as recited in claim 21, comprising causing the audio to be downloaded into the universal controlling device.*

23. *The method as recited in claim 1, comprising causing the universal controlling device to perform an operation in response to a sound input.*

24. *The method as recited in claim 1, comprising causing data to be received into the universal controlling device for upgrading an application of the universal controlling device that is used to transmit the first data.*

25. *The method as recited in claim 1, comprising causing data used to setup at least the graphical user interfaces to be stored in a memory of the controlling device.*

26. *The method as recited in claim 25, wherein the memory comprises a non-volatile read/write memory.*

27. *The method as recited in claim 1, comprising causing the graphical user interface icons displayed in the display of the universal controlling device to be changed as a function of an operational mode of the universal controlling device.*

28. *The method as recited in claim 1, comprising causing a cue indicative of an operational mode of the universal controlling device to be presented.*

29. *The method as recited in claim 28, wherein the cue is presented via a speaker of the universal controlling device.*

30. *The method as recited in claim 29, wherein the cue is presented via a LED of the universal controlling device.*

31. *The method as recited in claim 30, wherein the LED is disposed under a hard key of the universal controlling device.*

32. *The method as recited in claim 30, comprising causing the cue presented via use of the LED to be changed in response to the operational mode of the universal controlling device being changed as a result of an activation of a toggle element of the universal controlling device.*

33. *The method as recited in claim 32, wherein the toggle element comprises a soft key displayed in the display.*

34. *The method as recited in claim 1, comprising causing the first data representative of the displayed graphical user interface icon selected by the first input type to be transmitted to a first appliance and causing the second data representative of the motion made across the touch-sensitive surface provided by the second input type to be transmitted to a second appliance different than the first appliance.*

35. *The method as recited in claim 1, comprising storing in a memory of the universal controlling device command codes for controlling functional operations of at least one appliance.*

36. *The method as recited in claim 1, comprising using a local operation of the universal controlling device to setup the one or more graphical user interfaces of the universal controlling device.*

37. *The method as recited in claim 1, comprising using a local operation of the universal controlling device to setup the universal controlling device to command functional operations of at least one appliance.*

\* \* \* \* \*